(12) United States Patent  (10) Patent No.: US 12,456,143 B2
Rhoads et al.  (45) Date of Patent: Oct. 28, 2025

(54) ENHANCED NEURAL NETWORK SYSTEMS AND METHODS

(71) Applicant: Digimarc Corporation, Beaverton, OR (US)

(72) Inventors: Geoffrey B. Rhoads, West Linn, OR (US); Ravi K. Sharma, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 1169 days.

(21) Appl. No.: 17/323,652

(22) Filed: May 18, 2021

(65) Prior Publication Data

US 2021/0357690 A1  Nov. 18, 2021

Related U.S. Application Data

(60) Continuation-in-part of application No. 16/880,778, filed on May 21, 2020, now Pat. No. 11,599,744, (Continued)

(51) Int. Cl.
*G06Q 30/0601* (2023.01)
*G06F 18/214* (2023.01)
(Continued)

(52) U.S. Cl.
CPC ....... *G06Q 30/0641* (2013.01); *G06F 18/214* (2023.01); *G06F 18/22* (2023.01); (Continued)

(58) Field of Classification Search
CPC ... G06Q 30/0641; G06F 18/214; G06F 18/22; G06F 18/2431; G06V 10/764; (Continued)

(56) References Cited

U.S. PATENT DOCUMENTS 5,903,884 A  5/1999  Lyon
10,007,863 B1  6/2018  Pereira
(Continued)

FOREIGN PATENT DOCUMENTS

CN  105740909 A  *  7/2016

OTHER PUBLICATIONS

NPL—Bai et al., (CN 105740909 A) Published Jul. 6, 2016 (Machine Translation total 12 pages) (Year: 2016).*
(Continued)

*Primary Examiner* — Quoc A Tran
(74) *Attorney, Agent, or Firm* — Klarquist Sparkman, LLP

(57) ABSTRACT

Two stages of a convolutional neural network are linked by an interconnect that effects a spatial transposition of array data. The spatial transposition can include rotation, scaling, or translation (e.g., in x- or y-directions). A parameter characterizing the transposition (e.g., a parameter identifying rotation angle) can be learned by the same training process that is also used to learn other network parameters, such as layer coefficients. Additionally, or alternatively, data input to a neural network comprises—for each pixel in a patch of imagery—plural data that each indicates a relationship between the value of the pixel, and the value of a neighboring pixel. Some such neural networks can be trained to indicate the presence of a digital watermark signal in the patch of imagery—or a parameter characterizing such a digital watermark signal. Other features and arrangements are also detailed.

26 Claims, 13 Drawing Sheets

STAGE A OUTPUT

90° TWIST OF INTERCONNECT YIELDS:

STAGE B INPUT

Related U.S. Application Data which is a division of application No. 15/726,290, filed on Oct. 5, 2017, now Pat. No. 10,664,722.

(60) Provisional application No. 63/029,662, filed on May 25, 2020, provisional application No. 62/404,721, filed on Oct. 5, 2016.

(51) Int. Cl.
| | |
|---|---|
| *G06F 18/22* | (2023.01) |
| *G06F 18/2431* | (2023.01) |
| *G06N 3/04* | (2023.01) |
| *G06N 3/08* | (2023.01) |
| *G06V 10/764* | (2022.01) |
| *G06V 10/774* | (2022.01) |

(52) U.S. Cl.
CPC ........ *G06F 18/2431* (2023.01); *G06V 10/764* (2022.01); *G06V 10/774* (2022.01); *G06N 3/04* (2013.01); *G06N 3/08* (2013.01)

(58) Field of Classification Search
CPC .......... G06V 10/774; G06N 3/04; G06N 3/08; G06N 3/045
See application file for complete search history.

(56) References Cited

U.S. PATENT DOCUMENTS

| | | | |
|---|---|---|---|
| 10,664,722 B1 | 5/2020 | Sharma | |
| 2013/0308045 A1 | 11/2013 | Rhoads | |
| 2014/0108309 A1 | 4/2014 | Frank | |
| 2015/0055855 A1 | 2/2015 | Rodriguez | |
| 2015/0161482 A1 | 6/2015 | Preetham | |
| 2015/0170001 A1 | 6/2015 | Rabinovich | |
| 2015/0242707 A1 | 8/2015 | Wilf | |
| 2015/0278224 A1 | 10/2015 | Jaber | |
| 2016/0140425 A1 | 5/2016 | Kulkarni | |
| 2016/0267358 A1 | 9/2016 | Shoaib | |
| 2016/0379091 A1 | 12/2016 | Lin | |
| 2017/0132496 A1* | 5/2017 | Shoaib | G06N 3/0464 |
| 2017/0294010 A1 | 10/2017 | Shen | |
| 2017/0316281 A1 | 11/2017 | Criminisi | |
| 2018/0005343 A1 | 1/2018 | Rhoads | |
| 2018/0032844 A1 | 2/2018 | Yao | |
| 2018/0165548 A1 | 6/2018 | Wang | |
| 2019/0057314 A1 | 2/2019 | Julian | |
| 2019/0266749 A1 | 8/2019 | Rhoads | |

OTHER PUBLICATIONS

Coli, et al, The toroidal neural networks, 2000 IEEE International Symposium on Circuits and Systems (ISCAS) May 28, 2000 (vol. 4, pp. 137-140).

Palazzari, et al, Massively parallel processing implementation of the toroidal neural networks, Proceedings of the 2000 6th IEEE International Workshop on Cellular Neural Networks and their Applications, May 25, 2000 (pp. 295-300).

Mikulski, et al, Toroidal AutoEncoder, arXiv preprint arXiv:1903.12286. Mar. 28, 2019.

Chapelle, et al, Model selection for support vector machines, Advances in neural information processing systems. 1999;12:230-6.

Tang, et al, Diagonal and toroidal mesh networks, IEEE Transactions on Computers. Jul. 1994;43(7):815-26.

Babenko, et al, Neural Codes for Image Retrieval, arXiv preprint, arXiv:1404.1777 (2014), 16 pages.

Krizhevsky, et al, Imagenet Classification with Deep Convolutional Neural Networks, Advances in Neural Information Processing Systems, 2012, 9 pages.

LeCun et al, Handwritten Digit Recognition with a Back-Propagation Network, Advances in Neural Information Processing Systems, pp. 396-404, 1990.

Szegedy, et al, Going Deeper with Convolutions. IEEE Conference on Computer Vision and Pattern Recognition, pp. 1-9, 2015.

Szegedy, et al, Intriguing Properties of Neural Networks, arXiv preprint, arXiv:1312.6199v4, 2014, 10 pages.

Zeiler et al, Visualizing and Understanding Convolutional Networks, European Conference on Computer Vision, 2014, 16 pages.

Chen et al, Clusternet: Deep hierarchical cluster network with rigorously rotation-invariant representation for point cloud analysis, IEEE/CVF Conference on Computer Vision and Pattern Recognition 2019 (pp. 4994-5002).

Cheng et al, Rifd-Cnn: Rotation-invariant and fisher discriminative convolutional neural networks for object detection, IEEE Conference on Computer Vision and Pattern Recognition 2016 (pp. 2884-2893).

Chidester, et al, Rotation equivariance and invariance in convolutional neural networks, arXiv preprint arXiv:1805.12301, May 31, 2018.

Deng, et al, Joint hand detection and rotation estimation using CNN, IEEE Transactions on Image Processing, Dec. 4, 2017;27(4):1888-900.

Esteves, et al, Polar transformer networks, arXiv preprint arXiv:1709.01889, Sep. 6, 2017.

Follmann, et al, A rotationally-invariant convolution module by feature map back-rotation, 2018 IEEE Winter Conference on Applications of Computer Vision (WACV) Mar. 12, 2018 (pp. 784-792), IEEE.

Jaderberg et al, Spatial transformer networks, arXiv preprint arXiv:1506.02025, Jun. 5, 2015.

Ma et al, Arbitrary-oriented scene text detection via rotation proposals, IEEE Transactions on Multimedia, Mar. 23, 2018;20(11):3111-22.

Marcos et al, Rotation equivariant vector field networks, IEEE International Conference on Computer Vision 2017 (pp. 5048-5057).

Shi et al, Real-time rotation-invariant face detection with progressive calibration networks, IEEE Conference on Computer Vision and Pattern Recognition 2018 (pp. 2295-2303).

Weiler et al, Learning steerable filters for rotation equivariant CNNs, IEEE Conference on Computer Vision and Pattern Recognition 2018 (pp. 849-858).

Zhang X, Liu L, Xie Y, Chen J, Wu L, Pietikainen M, Rotation invariant local binary convolution neural networks, IEEE International Conference on Computer Vision Workshops 2017 (pp. 1210-1219).

* cited by examiner

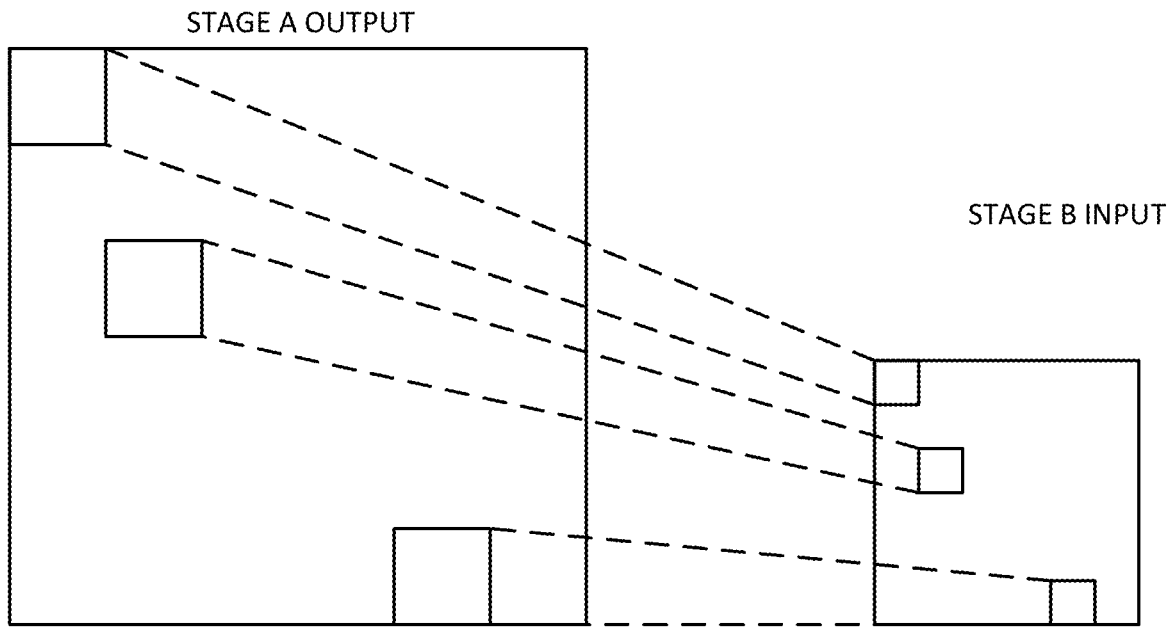
FIG. 2      PRIOR ART
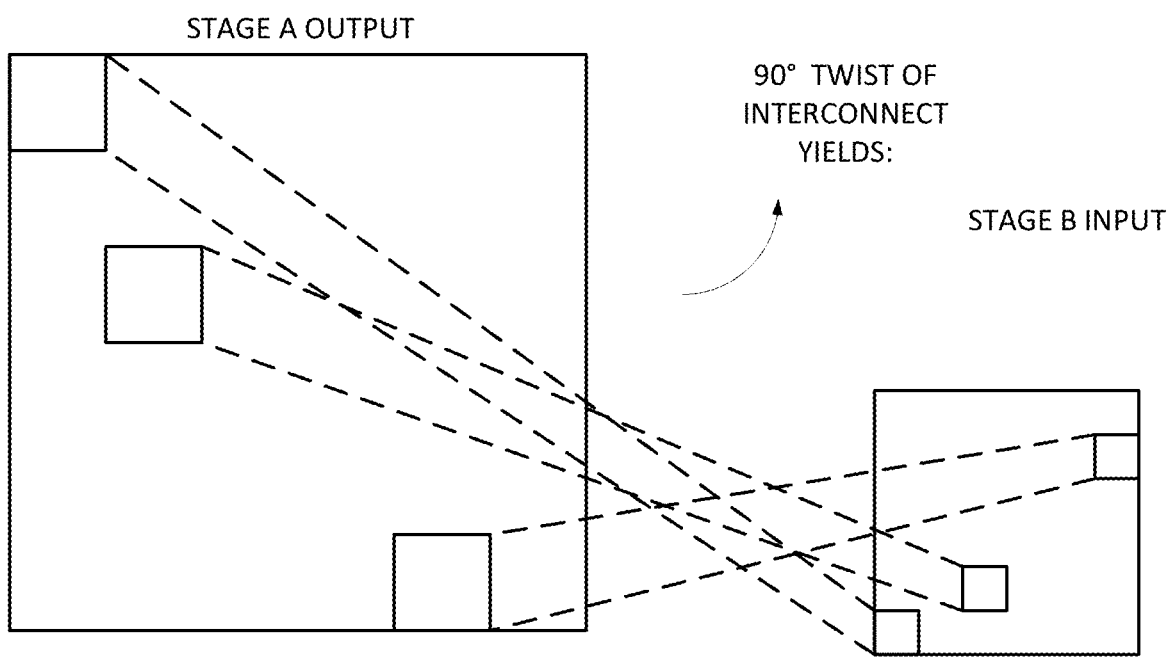
FIG. 3

IF CENTER > NEIGHBOR, +1
IF CENTER < NEIGHBOR, -1
OCT-AXIS = {-1 + -1 + -1 + -1 + 0 +1 +1 + -1} = -3

ENHANCED NEURAL NETWORK SYSTEMS AND METHODS

RELATED APPLICATION DATA

This application claims priority to provisional application 63/029,662, filed May 25, 2020. This application is also a continuation-in-part of application Ser. No. 16/880,778, filed May 21, 2020, which is a division of application Ser. No. 15/726,290, filed Oct. 5, 2017 (now U.S. Pat. No. 10,664,722), which claims priority to provisional application 62/404,721, filed Oct. 5, 2016.

This application further relates to work detailed in applicant's patent publication 20190266749 and in application Ser. No. 16/994,251, filed Aug. 14, 2020.

The disclosures of the above-referenced applications are incorporated herein by reference. The following disclosure should be read as extending that earlier work, and encompassing those previous techniques combined with the present improvements.

INTRODUCTION

Convolutional neural networks (CNNs) are exceptionally powerful data processing tools. However, applicant has found that CNN performance can be further improved by various methods described herein.

An embodiment incorporating one exemplary aspect of the present technology is a neural network comprising plural stages, characterized by a twisted interconnect that couples two of the stages.

The foregoing and other aspects and details of the applicant's work will be more readily apparent from the following detailed description, which proceeds with reference to the accompanying drawings.

BRIEF DESCRIPTION OF THE DRAWINGS

FIG. 2 illustrates a spatial mapping between two stages in the network of FIG. 1.

FIG. 3 illustrates a spatial mapping including a twisted interconnect between two stages of a convolutional neural network.

DETAILED DESCRIPTION

Figure 1:
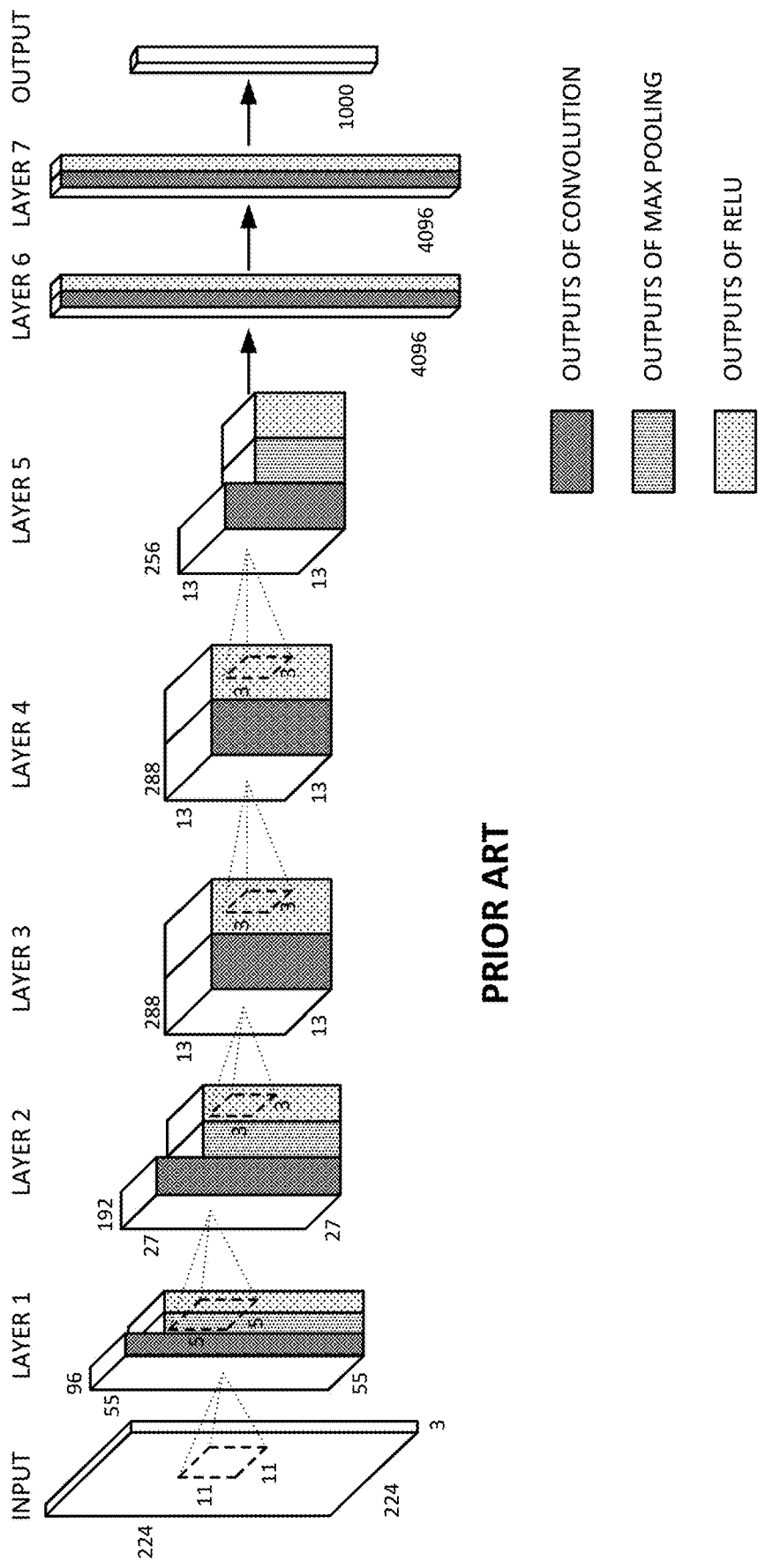
FIG. 1 is a block diagram of an illustrative convolutional neural network.

A number of novel arrangements involving neural networks are detailed in cited U.S. Pat. No. 10,664,722, including one entitled "Twisted Networks." In such networks, orientation of image-derived data is not maintained from one stage of a neural network to a next. Instead, the data is spatially twisted, e.g., by 90 degrees. For example, a row of data at the top of a block (array) of data output by one stage is twisted—with the rest of that data block—so that it is repositioned along a side edge for processing by the next stage.

In particular, U.S. Pat. No. 10,664,722 teaches as follows (the drawing references are modified to correspond to the numbering of the drawing sheets accompanying the present application):

"Returning to the illustrative network of FIG. 1, data passes from left to right—both between stages within a layer, and between successive layers. Each stage receives one data structure as input, and provides another data structure as output. In image processing networks, each of these data structures commonly is a 2D array of elements (originally corresponding to rows and pixels of the block of input data). Each data structure may thus be conceptualized as having top, bottom, and side edges. (The implementation of these data structures in physical memory may be arranged otherwise, e.g., as a 1D array of values.) Each of these output data structures is conveyed by an interconnect (most commonly a logical link, rather than a physical coupling) to a next stage, where it serves as the input data structure.

Normally, as shown in FIG. 2, these interconnects may be said to maintain uprightness. That is, elements along the top edge of one stage's output data structure are provided as the data elements along the top edge of the next stage's input data structure. Similarly with the sides and bottom. (What starts on top stays on top, etc.)

In accordance with a further aspect of the present technology, one or more interconnections—between stages or between layers—we is arranged not to maintain uprightness. Instead, such interconnect is arranged to spatially transpose a data structure output by one stage prior to its provision as input to the next stage.

FIG. 3 shows one particular such variant interconnect. In the FIG. 3 interconnect, the data element in the upper left corner of a data structure output by one stage, is transposed by the interconnect to serve as the data element at the lower left corner of the data structure input to the next stage. All the other elements in the data structure output by stage A are similarly spatially transposed by 90 degrees when provided as the data structure input to stage B.

The FIG. 3 arrangement may be termed a twisted coupling interconnect, and more particularly a 90 degree twisted coupling interconnect.

An advantage of such an arrangement is that it allows the network to be trained to recognize objects at orientations other than a single, default, orientation. For example, a network trained with images of a can of Pepsi soda resting on its flat base may not be able to recognize a can of Pepsi soda if depicted resting on its side. The detailed arrangement, in contrast, can be trained with depictions of the upright can, and can then recognize the can resting on its side—without additional training.

Figure 4:
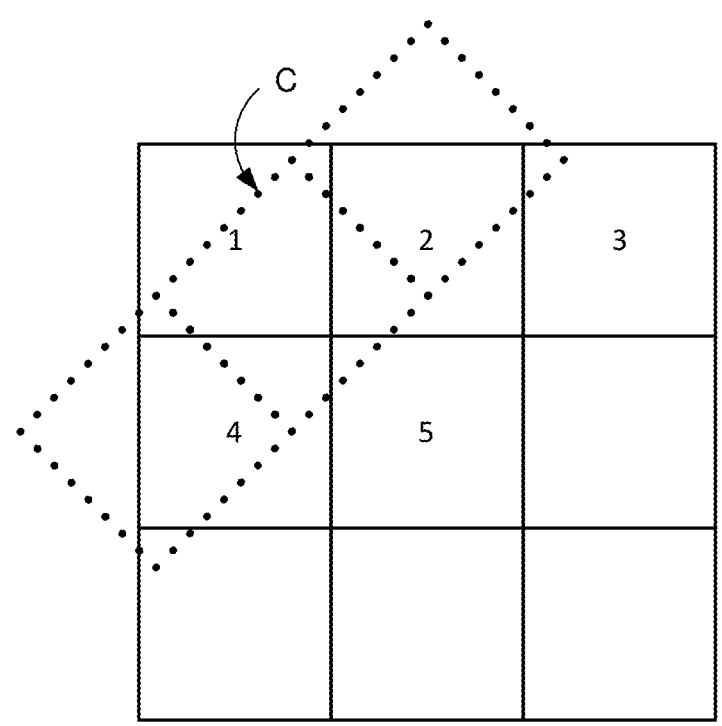
FIG. 4 illustrates how a twisted interconnect, of an arbitrary angle, can be realized.

While twists in increments of 90° are simplest, other angular twists can also be achieved. FIG. 4 depicts a twisted relationship between an output data structure of one stage (in solid lines) and an input data structure of a next stage (in dotted lines). The value of the center dotted input datum "C" is the weighted sum of four solid line output data, weighted in proportion to their respective area overlaps (e.g., 54% the value of output datum 1, plus 21% the value of output datum 2, plus 21% the value of output datum 4, plus 4% the value of output datum 5).

To increase the reliability of object recognition at different orientations, several paths through the network, traversing several different twisted coupling interconnects in parallel with a standard interconnect (which maintains uprightness) may be used.

Figure 5:
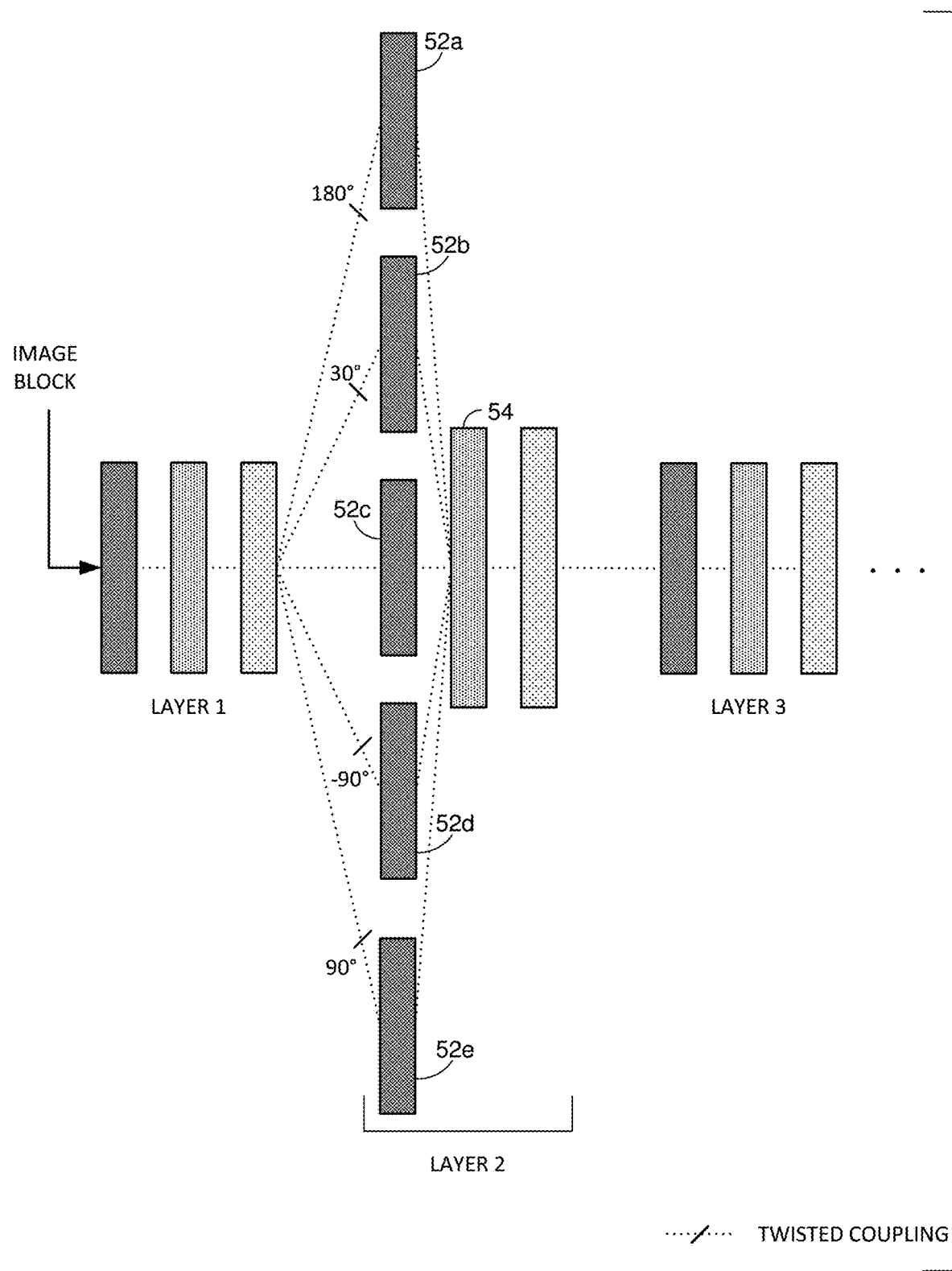
FIG. 5 shows a convolutional neural network involving multiple different twisted interconnects from a common layer.

FIG. 5 shows one such an arrangement, in which the output stage of layer 1 feeds five interconnects to five subsequent stages 52*a*-52*e*. One interconnect is standard (maintaining uprightness), and the others are twisted couplings with twists, respectively, of 180°, 30°, −90° and 90°. Of course, an arbitrary number of such interconnects and stages can be used.

Figure 6:
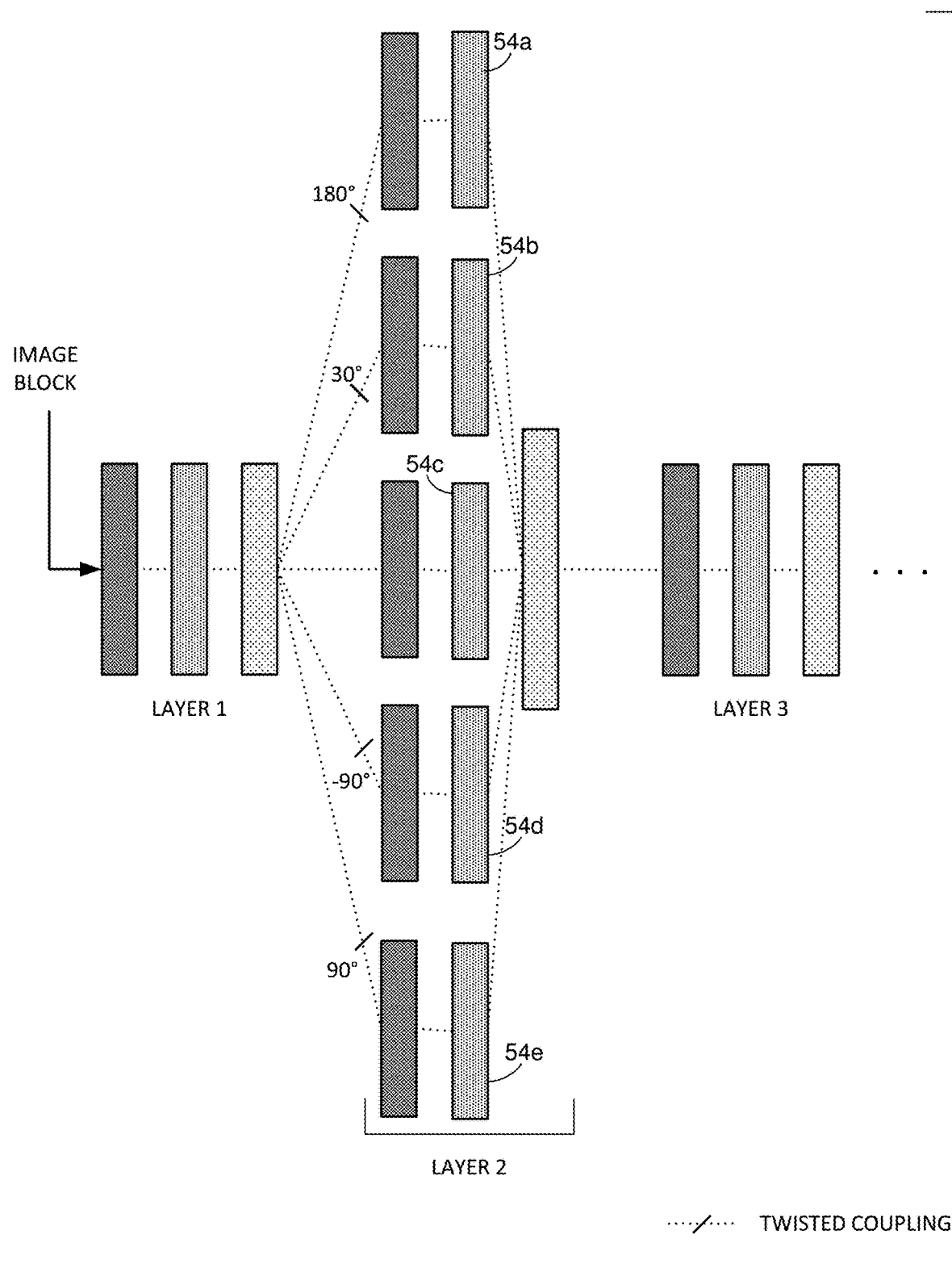
FIG. 6 shows a variant of the FIG. 5 network.

In the FIG. 5 arrangement, the multiple stages 52*a*-52*e* fed with differently-twisted inputs feed into a common subsequent stage 54, which is larger on account of the larger number of elements provided as input (i.e., the output data structures provided by stages 52*a*-52*e*). In other embodiment, the multiple stage architecture can be maintained for one or more stages, or layers, further through the network, e.g., as shown in FIG. 6."

The twisting can be between any of the stages—either within a layer, or between two layers. In the case of convolution stages, the twist can be applied as a preliminary operation—twisting a data array output from a preceding stage before it is input to the convolution operation.

In accordance with an aspect of the present technology, the twist between one stage of the network and a next stage is not a value established in advance by a network designer, such as the cited values of 180°, 30°, −90° and 90°. Instead, the rotation is a parameter that is associated with each convolution kernel (filter). This parameter is learned using whatever class of technique is used to learn the kernel coefficients (e.g., by reverse gradient descent). The network iteratively learns—through training—which rotation between two stages of the network is advantageous.

A network may include several such twists—either in a parallel arrangement (as in FIGS. 5 and 6), and/or in a series arrangement (e.g., as when a first learned twist is employed between Layer1 and Layer2, and a second learned twist is employed between Layer2 and Layer3, etc.). A different rotation parameter is typically learned for each convolution kernel, although a single rotation parameter may be learned for all convolutional kernels within a layer, for all layers in the network, etc.

In effecting rotations other than multiples of 90 degrees, interpolation is used, as was described above in connection with FIG. 4. In that drawing, the input interpolated values to the next stage (shown by the dotted squares) have the same span, in area, as the output values from the prior stage (shown by the solid squares). But this need not be the case. The areas of the latter elements can be larger, or smaller, than the areas of the former elements. This effects a change in scale state. A scaling parameter, either larger or smaller than 1.0, can similarly be learned for each twisted interconnect. Each learned value is used in computing the corresponding interpolated output values.

Figure 7A:
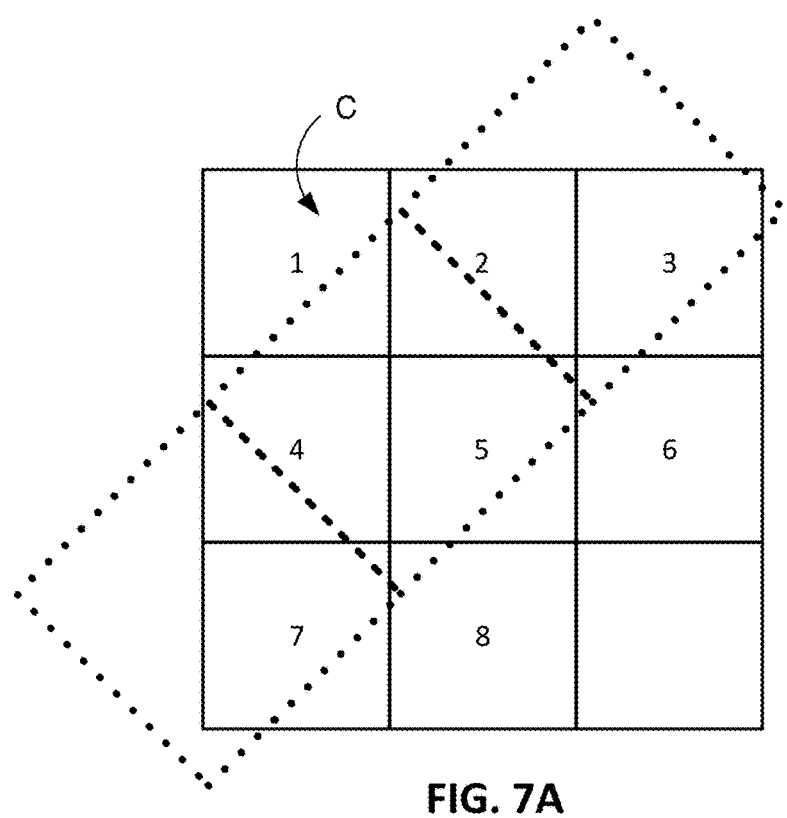
FIG. 7A illustrates how a twisted interconnect can vary scale as well as rotation.

FIG. 7A illustrates. Here the dotted boxes are larger than the solid boxes. The dotted box sides are 145% the length of the solid box sides. Each dotted box thus has 210% the area of each solid box. The value of the data in the center dotted box, to be input to the next stage, is a weighted sum of the values of solid boxes numbered 1, 2, 4, 5, 6, 7 and 8 (weighted by the fraction of the latter box included in the dotted box). This value is then normalized, i.e., by dividing by the ratio of areas, here 2.1.

Again, a different scale parameter can be learned for each twisted interconnect (e.g., convolution kernel), or a common scale parameter can be learned for larger groupings of interconnects.

Figure 7B:
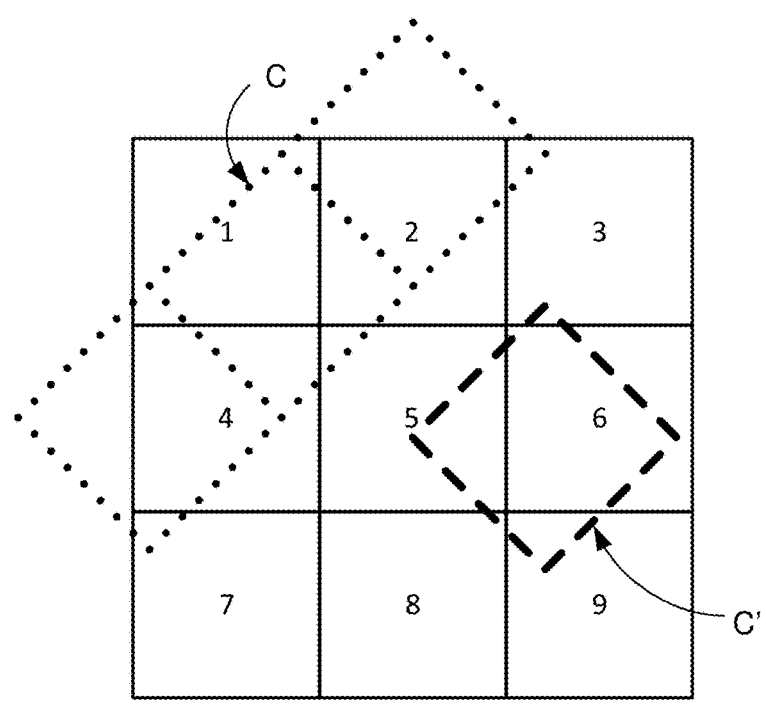
FIG. 7B illustrates how a twisted interconnect can vary translation, as well as rotation and scale.

In the examples of FIGS. 4 and 7A, each twisted output datum is a function based on a spatially co-located set of input data. But this, too, need not be the case. Consider FIG. 7B. In this case the datum computed for element C is computed not as a weighted sum from the prior stage output data that is spatially co-located, i.e., data elements 1, 2 4 and 5. Instead, the element C datum is computed from prior stage output data that is shifted, in x- and y-dimensions, as shown by the bold dashed square C.' That is, the datum C input to the next stage is a weighted sum of prior stage output data at locations 3, 5, 6, 8 and 9.

Again, the two magnitudes of the shift, i.e., the distances (e.g., in pixels) in the horizontal (x) and vertical (y) directions, are parameters that are learned during training. ("Pixels" may be a technical misnomer, but since the data arrays are derived from image pixels, applicant refers to such derivative data as pixels too.)

While twisting of the network usually occurs between the layers (exemplary prior art layers are shown in the network of FIG. 1), twisting can additionally or alternatively be used between the stages that comprise a layer, e.g., in the coupling between a convolution stage and a max pooling stage, or between a max pooling stage and a ReLU stage, etc.

Thus one aspect of applicant's inventive work is a network that involves twisted coupling between network stages, where the twist is characterized by a rotation, scale, x-translation, and/or y-translation—the value of which is learned during a training phase of network. (It will be noted that "twist" is used herein to refer to a geometrical transformation that may include rotation and may include other transformations. It is used in preference to potentially more descriptive terms due to its brevity.)

The just-noted twist operations: rotation, scaling, and translation, can be used in tandem—each learned using training data. Each may involve data beyond the array size—reaching out beyond the end of the world for data, so to speak (e.g., the dotted boxes extending outside the boundaries of the square data structure of FIG. 4). In such case a modulo operator is desirably applied. If data off the right edge of the array is required, it loops back into the array from the left. Similarly with the top and bottom. The square array of data is mapped into a torus—repeating back on itself horizontally and vertically.

Figure 8:
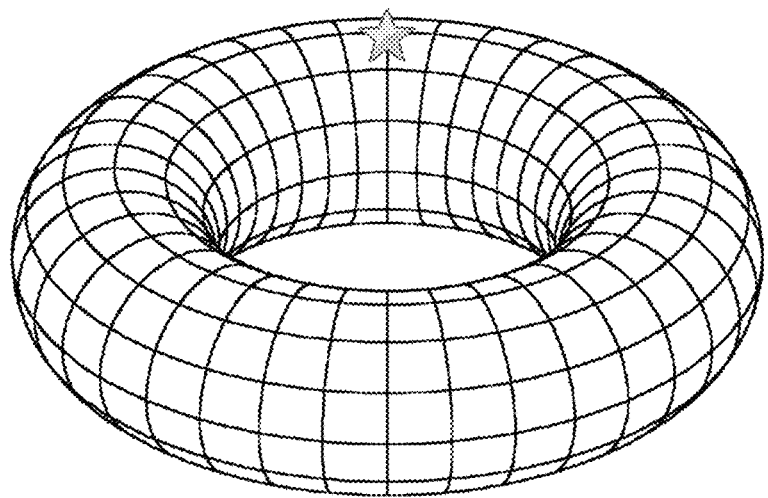
FIG. 8 illustrates a 2D data array mapped into a torus.
Figure 9:
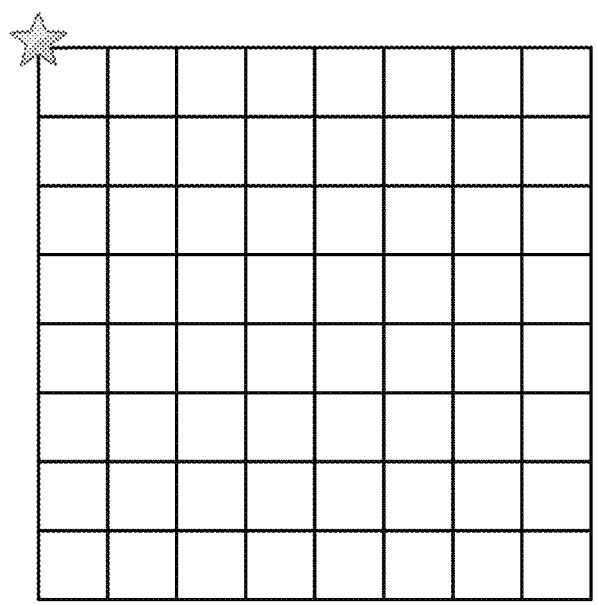
FIG. 9 shows the 2D array of FIG. 8 mapped into planar form.

FIG. 8 illustrates a 2D data array mapped into a torus. (In this case the number of rows and columns are unequal, but it was a handy illustration). The sequence of array elements that circle around the vertical axis of the depicted toroid may be regarded as rows of data. The sequence of array elements that loop between the inner and outer surfaces of the annular ring may be regarded as columns of data. The upper left corner of the 2D array (shown by the star in FIG. 9) can be at an arbitrary place on the torus; an exemplary location is on the "top" surface, on the "north" side, as shown in FIG. 8.

Applicant has determined that this torus construct is well suited for, e.g., neural network recognition of digital watermark signal patterns. As is familiar to artisans, e.g., from patent documents 20190266749, 20190332840, 6,590,996, 9,521,291, 9,959,587, 10,242,434, and 10,460,413, and pending application Ser. No. 16/849,288, filed Apr. 15, 2020, and Ser. No. 16/994,251, filed Aug. 14, 2020 (each of which is incorporated by reference), digital watermark patterns typically include a reference, or synchronization, signal comprised of a multitude of spatial sinusoids of different frequencies. Applicant has discovered that the spatially-repeating 2D nature of these signal components is a good match to the spatially-repeating 2D nature of a toroidal data structure.

A network may employ a single stage with this toroidal attribute, or multiple stages can be so-arranged.

Thus, another aspect of applicant's inventive work is a network that involves one or more stages having a data structure with toroidal behavior. While applicant prefers to use toroidal stages in conjunction with twisted networks, such toroidal techniques can be employed in networks employing conventional interconnects. (For example, convolution operations that "run out of data" when operating on data elements along a perimeter of the data array can instead use data retrieved from the opposite side of the array, in toroidal fashion.)

In accordance with yet another aspect of applicant's technology, the information input for each location in the, e.g., 244×244 input array is not a single pixel value indicating greyscale intensity (or three values indicating three color intensities). Rather, for each location in the input array a vector of data is provided, e.g., comprising eight values. These eight values indicate the relation between a pixel value at that location, and pixel values for eight of its neighbors. Moreover, in a particular embodiment, each of the values comprising a vector is of tri-state value, e.g., either a −1, a 0 or a +1, respectively indicating that the pixel at the subject location has a value greater than, equal to, or less than, a particular neighbor.

Figure 10:
FIG. 10 shows sample values for an excerpt of greyscale pixel imagery around a subject pixel, and how those values may be non-linearly-processed to yield an oct-axis-filtered value for that subject pixel.

FIG. 10 shows, at the left, an excerpt of greyscale imagery, indicating values for the depicted pixels. In applicant's previous work, as described in the earlier-cited patent documents, imagery is filtered with a non-linear "oct-axis" filter prior to processing to detect a watermark pattern. Each pixel's value is replaced with a scalar sum derived from relationships between the pixel's value and those of its neighbors, as shown on the right side of FIG. 10. In this example the bolded pixel has a value of 79, which is less than the pixel value of 82 to its north, contributing a −1 value to a scalar sum. The pixel's value of 79 is also less than the pixel values to the northeast, east, and southeast (85, 82 and 83), contributing three more values of −1 to the scalar sum. The value to the south is equal to 79, contributing a 0.79 is less than the values to the southwest and west (78 and 76), contributing two value of +1 to the scalar sum. Finally, 79 is less than the value to the northwest (80), adding a final −1 value to the scalar sum. The sum is thus −3. This is the oct-axis value for the bolded pixel.

(Many variants to such oct-axis filtering arrangement are possible, as indicated in the cited documents.)

Such oct-axis filtered scalar pixel data can be provided as input data to a network incorporating a twisted interconnect, or toroidal behavior, as described above. But applicant prefers a different arrangement in which the eight component values, which are summed to produce an oct-axis scalar, are instead preserved as an ordered vector, e.g., indicating the relationship of the pixel to its eight neighbors—starting at the north and proceeding clockwise. In the depicted example, such a vector would be {−1, −1, −1, −1, 0, 1, 1. −1}.

Vector data, as just described, can be input to a prior art network, of the sort shown in FIG. 1. The eight values for each location may be treated as an extension of the three values for each location shown (i.e., RGB color values). But in such example, each value has one of just three values, instead of 256. (In one of the variants of oct-axis filtering, there is no "0" value. If the subject pixel has a value greater than or equal to a neighbor, the corresponding contribution to the oct-axis calculation +1. In such variant, each value input to the network would be a binary value, e.g., consisting of a −1 or +1 value.)

Figure 11:
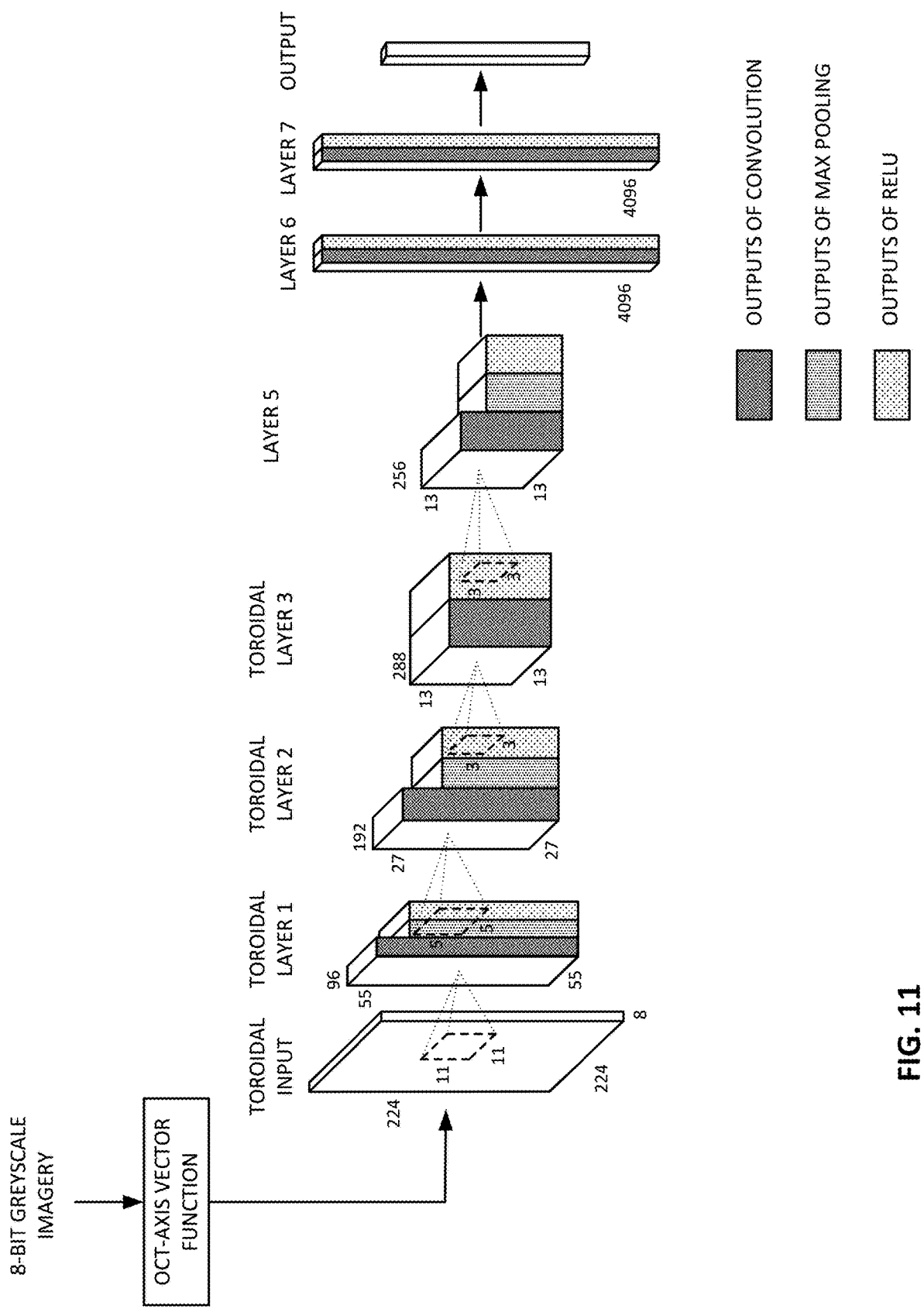
FIG. 11 shows a neural network employing both non-linearly-filtered input imagery, and toroidal layers.

Applicant prefers, however, to use tristate vector data as input to a network employing both twisted interconnects and toroidal behavior. One such network is shown in FIG. 11 (although the twisted interconnects are not particularly depicted). The exemplary 11×11 convolutional kernel shown at the left edge of the figure is actually an 11×11×8 kernel—operating on all eight vector values within an 11×11 patch of image data. There are 96 such kernels—one for each of the convolutions performed in Layer1. As in conventional neural networks, the coefficients comprising such kernels are learned through a training process, e.g., employing reverse gradient descent or other technique. However, instead of learning 11×11×8 coefficients for each of the 96 convolution kernels, one or more further coefficients is learned: the parameter(s) specifying the twist. In alternative embodiments, a common twist parameter(s) may be used with all 96 convolution kernels.

(In some embodiments the image data itself is also input to the network, together with the data just-detailed.)

In a simple example, the network output stage at the far right has two output neurons. Network activation of one neuron indicates that the input greyscale imagery likely includes a digital watermark pattern; activation of the other indicates the imagery likely has no such pattern. Such behavior is achieved by training the network with samples of imagery, each known to include a watermark pattern or not, while the network parameters are refined to achieve correct activation of the two output neurons.

In another example, the network output stage has three output neurons. One indicates detection of a first variety of watermark pattern (e.g., a watermark incorporating a first reference signal that is included in watermarks used for point of sale product identification applications). The second indicates detection of a second, different variety of watermark pattern (e.g., incorporating a second reference signal that is included in watermarks used for recycling identification of plastic type). The third neuron indicates detection of no watermark pattern in the input imagery. Again, the network is trained to achieve such discrimination, using known samples of each type of input.

In still another example, the network has many output neurons, and is trained to activate a different one depending on the scale of a watermark in the input imagery. One neuron may fire if the scale is between 50% and 79%. A second may fire if the scale is between 79% and 125%. A third may fire if the scale is between 125% and 200%. A fourth may fire if no watermark is detected.

Similarly, in another network, different neurons are trained to fire to indicate the detected rotation state of a watermark pattern in the input imagery, e.g., in angular ranges spanning 90, 30 or 10 degrees. In yet another network, different neurons are trained to fire depending on the translation of the watermark in the horizontal dimension within the input imagery, within desired ranges. Or similarly in the vertical dimension.

Still further, different neurons may fire depending on combinations of such rotation, scale and/or translation parameters of a watermark pattern depicted in the input imagery. One neuron can fire if the imagery likely includes a watermark having a scale state between 120% and 200%, and also has a rotation state between 60 and 90 degrees, and also has a translation in the horizontal direction of between 64 and 96 waxels, and also has a translation in the vertical direction of between 0 and 32 waxels. Etc.

Latter-Layer Regulated-Density Toroidal N-Mappings

The notion of convolution itself, using say 11 by 11 2D kernels, is implicitly and inherently related to the 2-dimensional topology of images and pixels. As with the human visual system and its early stage (visual cortex) processing, preserving basic forms of hierarchical 2D structure remains important, as it likewise remains important to convolutional neural networks. But practitioners understand that as the state information (the values of datum inside the layers) progresses left to right through the layers and toward the outputs, the initial 2D topological dominated state-information slowly morphs toward the semantic and definitional topology which will conform to the discrete outputs. That is an apple, not an orange, and the parts of the brain triggering that statement have generally lost all aspects of 2D topology and instead are dominated by recognition to word neural processing.

Figure 13:
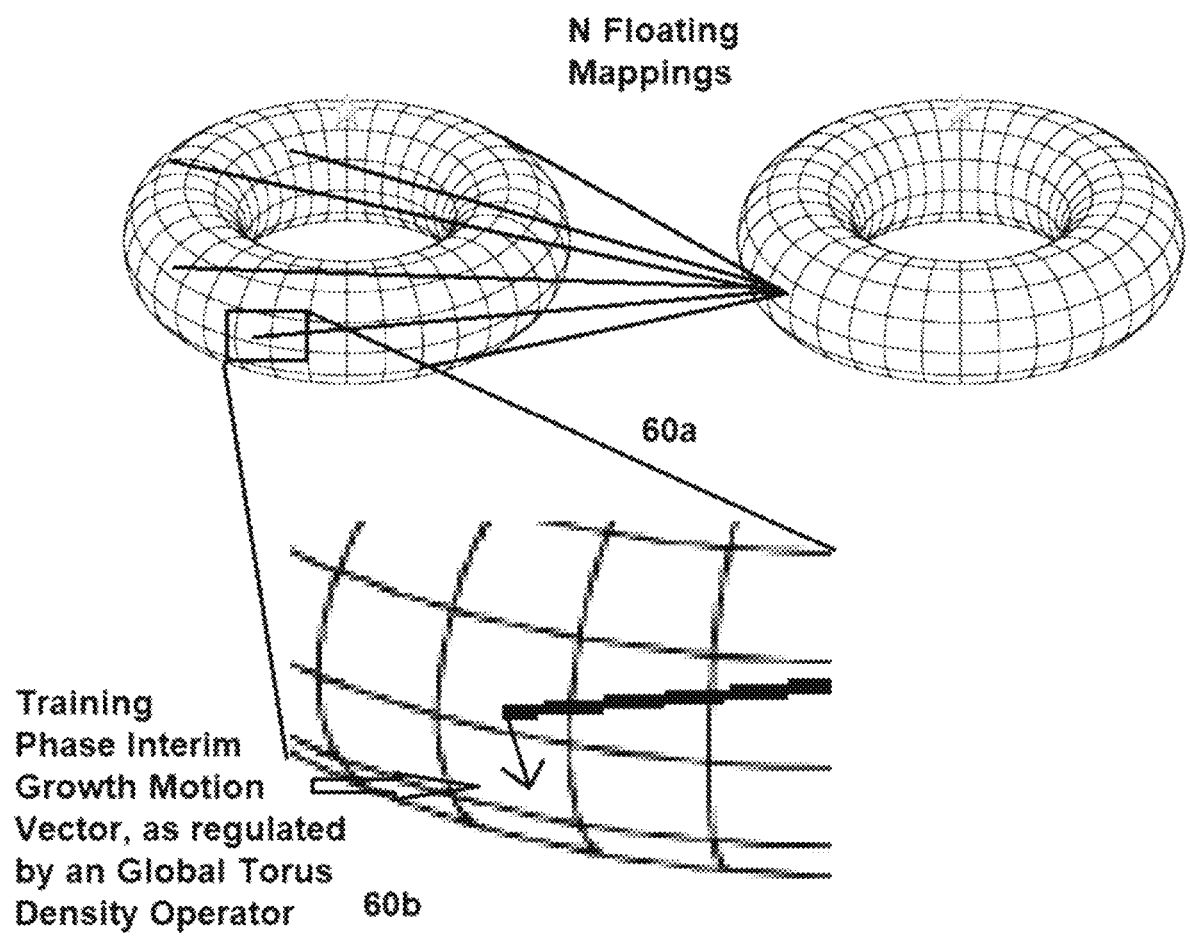
FIG. 13 illustrates certain alternatives for mappings between toroidal layers.

A similar dropping of the convolutional concept itself can assist in mid to latter stages in FIG. 11. FIG. 13 visually summarizes the possibilities by showing that the K×K kernel (say, 3×3), can simply become N pseudo-randomly placed connections, still following the same rules of weighting the connections. Here, however, additional training freedom is given to the roaming abilities of where exactly on the previous torus a connection is made. This is inherently 'inter-datum' as well, i.e. floating point and not integer-index based, and the same interpolation issues discussed earlier apply here. 60a then has a zoom in window on one of the connections. 60b shows that there can exist a training phase motion vector of that connection to the previous torus. This motion vector can take on the same floating-point values (two variables in the case of travelling around a torus) that the kernel weights possess, and thus they are equally amenable to gradient-decent based training alongside all of the other free-floating training parameters. They just happen to be 'thrown out' once they have done their jobs during training. They have honed-in on the correct places on the torus to make the best connection. Applicant believes these types of capabilities can mimic and emulate the controlled chaos kinds of dynamics which must necessarily govern both early dendritic meanderings as well as more permanent dendritic choices in their connections.

Figure 14:
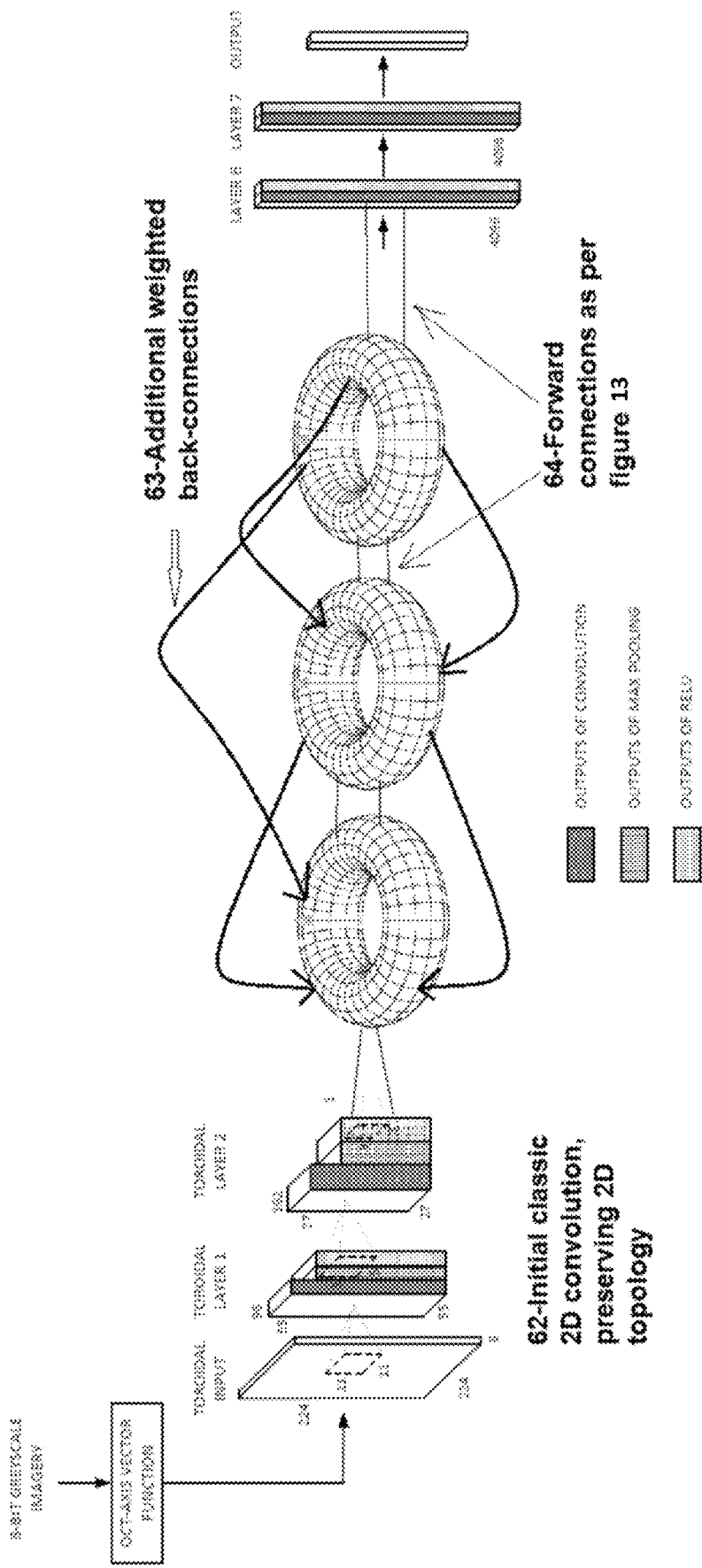
FIG. 14 is a block diagram of a convolutional neural network employing toroidal layers and back-connections.

T Total Global State Iterations where T>L, the Number of Layers; With Hard-Wired Back-Connections FIG. 14 posits that all primary output layers become global state parameters, and that all such parameters are initialized with very low level random values before even the first single image is used for training. These initial random values then propagate into the max-pooling and ReLU layers. With the input layer now also initialized, with its 8-valued oct-axis vector, we are now ready to iterate the state machine T times, where T might typically be 3 times larger than L, the number of Layers not counting the input layer. FIG. 14 depicts 5 layers, and hence the state machine may be globally strobed 15 times until such time that the final output would be deemed complete. This strobing of the global state machine only makes sense with the new addition of back connections, as will be explained.

Of note in FIG. 14 are the physical (or logical) back-connections being made between the toroidal layers (note 63). This global strobing of the entire set of state data, including its initialization, gives the reason for these physical back-connections. The pre-training primordial initialization is effectively a throw away set of data, since as training progresses, the initialization state of the network is also being trained via typical gradient decent methodologies (and other equivalent forms of good-bad behavioral recipes).

Stated in alternative terms, before even the first image is used for training the network, very small values are placed into all data-carrying entities. After a first image is trained, a 'dampened' or fractional copy of the final state of the global state variables within the toroidal levels is then used as the initialization for the next trained image (i.e. after the previous training image has completed). The input layer is of course loaded with an entirely new image to train for the next image in the training set, or in our case here, oct-axis vector data. The 2D convolutional layers 1 and 2 may have a much larger damping applied than do the toroidal layers, for example, 0.9× for the toroidal layers versus 0.05× for the initial 2 classic layers. These damping factors can also be trained as interim free variables, then fixed once the network is fully trained.

Note 62 indicates that it remains advantageous to keep certain 2D-topological layers early on, which after said damping factors are applied, are highly responsive to completely new input data. Note 63 points out that resultant values being computed for the toroidal layers can be weighted not only by previous toroids, but also later toroids. There is a certain sense of eliminating the concept of sequential operations with this addition. But forward connections still dominate, note 64, and hence still there is a general information flow from left to right. The state machine formulation posits that with each global pulse of the state machine, the input layer is still pumping its static data to layer 1, which in turn means that layer 2 remains feeding static data into the first toroidal layer, which then implies that only layer 2 needs to still be feeding its static data to layer 3. We have posited T=15 global pulse states, which means that layer 2 will reach its static state after 2 global pulses. The remaining 13 global pulses are then primarily exercising the back-connection weights, labelled 63. A diminishing-returns point for T is anticipated. Given the floating connection nature of these back-connections, with similar growth motion vectors as described in note 60b of FIG. 13, an idea here is that we are providing our learning network much greater freedom to operate as a function of state variables and number of connections.

Figure 15:
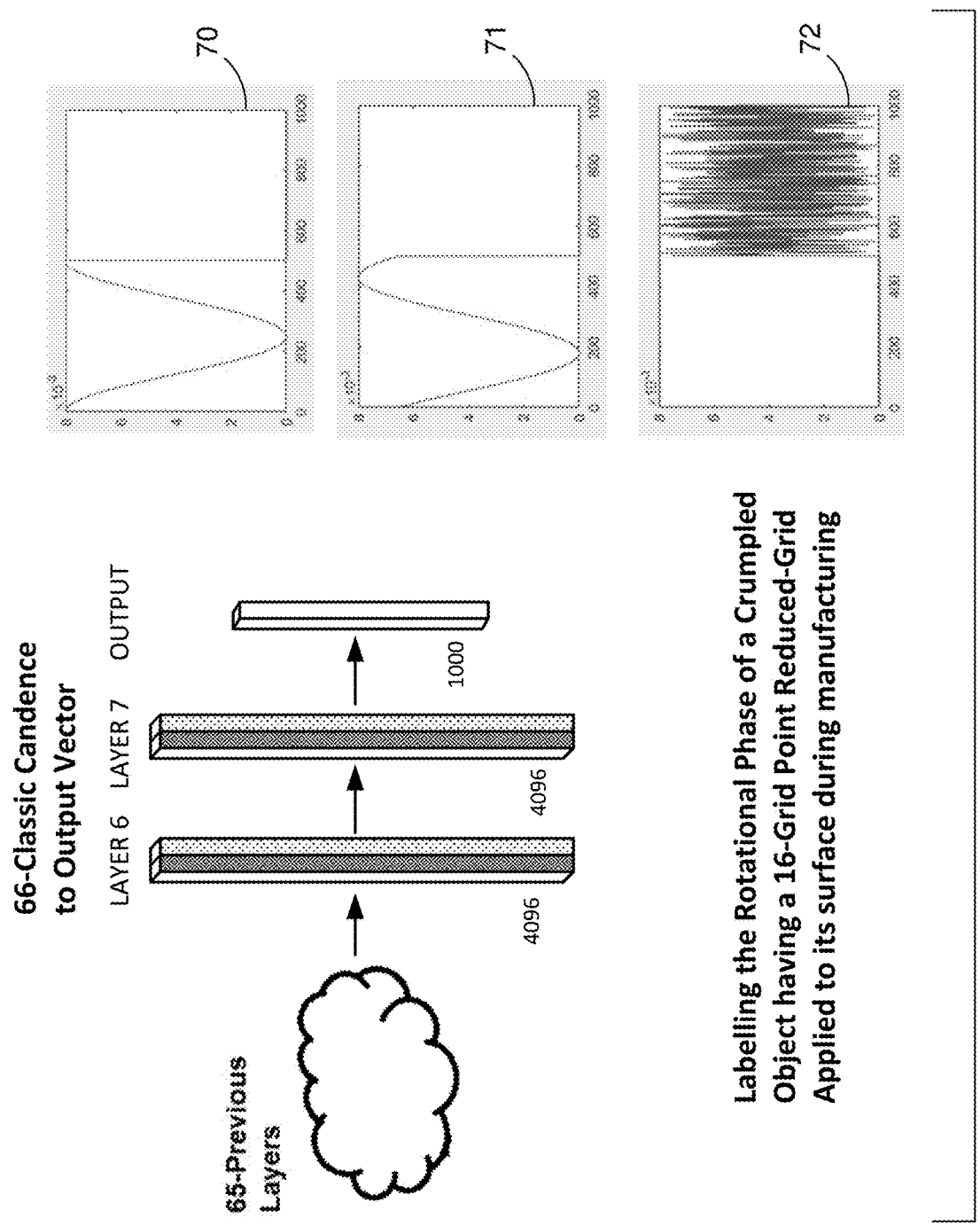
FIG. 15 illustrates an application-specific network tailored to detect and determine the rotation state of a crumpled watermarked object depicted in input imagery.

Training for the Existence and General Rotation State of a Watermarked Crumpled Object The principles of FIG. 15 and this section are significantly broader than the niche example presented in this section. This section does nevertheless zoom in on the digital watermark detection problem on so-called crumpled objects— objects which have been exposed to distortion and weathering in the extremes, such as waste flows.

FIG. 15 presents an embodiment in which half of the output values are exclusively reserved only for objects which have a very specific 16-UV-plane point grid signal (aka reference signal) applied to said objects. The term 'reduced grid' has been used for this minimalist approach to nevertheless still having an existence signal and a signal which can be used for rudimentary pose estimation of an object. Note 70 indicates that half of the output values can be trained to encode the rotation state of a crumpled object so embedded with such a grid. Examination of note 71 and the second graphic down indicates a 50 degree phase shift in training labels for training objects known to be so rotated. All other objects, including digitally watermarked objects with grid signals different than the one being trained on, will receive random and normalized values in the 501 to 1000 indices of the output.

(In FIG. 15, item 70 indicates a training label for a zero-rotated crumpled object having a 16-point reduced grid cosine profile on half of the 500 output values. Item 71 indicates a training label for a crumpled object rotated at 50 degrees (phase of the 500 output values have been shifted by 50 degrees). Item 72 indicates all non-watermarked crumpled objects, and all crumpled objects that are watermarked but with a grid that is not the specific 16-point reduced grid, will each and every training image have its own normalized random training label for the second half of the output values.)

Concluding Remarks

Having described and illustrated certain arrangements, it should be understood that applicant's technology is not so-limited.

For example, while embodiments of the technology were described based on one illustrative neural network architecture (of the so-called AlexNet variety), it will be recognized that different network topologies—now existing (as detailed in the incorporated-by-reference documents) and forthcoming—can be used, depending on the needs of particular applications.

Neural networks have various forms, and go by various names. Those that are particularly popular now are convolutional neural networks (CNNs)—sometimes termed deep convolutional networks (DCNNs), or deep learning systems, to emphasize their use of a large number of hidden (intermediate) layers. Exemplary writings in the field are attached as part of patent application 62/404,721, filed Oct. 5, 2016, which is incorporated herein by reference, and include:

Babenko, et al, Neural codes for image retrieval, arXiv preprint arXiv:1404.1777 (2014).

Donahue, et al, DeCAF: A Deep Convolutional Activation Feature for Generic Visual Recognition, Proc. 31$^{st}$ Int'l Conference on Machine Learning, 2014, pp. 647-655.

Girshick, et al, Rich feature hierarchies for accurate object detection and semantic segmentation, Proc. IEEE Conference on Computer Vision and Pattern Recognition, 2014, p. 580-587.

He, Kaiming, et al, Deep residual learning for image recognition, arXiv preprint arXiv:1512.03385 (2015).

Held, et al, Deep learning for single-view instance recognition, arXiv preprint arXiv:1507.08286 (2015).

Jia, et al, Caffe: Convolutional architecture for fast feature embedding, Proceedings of the 22nd ACM International Conference on Multimedia, 2014, pp. 675-678.

Krizhevsky, et al, Imagenet classification with deep convolutional neural networks, Advances in Neural Information Processing Systems 2012, pp. 1097-1105.

Deep Learning for Object Recognition: DSP and Specialized Processor Optimizations, Whitepaper of the Embedded Vision Alliance, 2016.

Wikipedia articles for Machine Learning, Support Vector Machine, Convolutional Neural Network, and Gradient Descent are part of the specification of patent application 62/371,601, filed Aug. 5, 2016, which is also incorporated herein by reference.

While some artisans may draw a distinction between the terms "layer" and "stage" in a neural network (e.g., a stage comprises a convolution layer, a max-pooling layer, and a ReLU layer), applicant does not maintain a strict distinction. Such terms may thus be regarded as synonyms herein.

In addition, or as an alternative, to indicating presence of a particular subject (e.g., a digital watermark pattern) in input imagery, a neural network according to the present technology can also be configured to determine and localize the position of such subject within the imagery. (Localization is commonly performed with many object recognition systems. See, e.g., the Girshick paper referenced above, and the paper by Sermanet, et al, Overfeat: Integrated recognition, localization and detection using convolutional networks, arXiv preprint arXiv:1312.6229, 2013, which is attached to patent application 62/414,368, filed Oct. 28, 2016. See also the paper by Oquab, et al, Is object localization for free? Weakly-supervised learning with convolutional neural networks, Proceedings of the IEEE Conference on Computer Vision and Pattern Recognition, 2015, which is attached to patent application 62/418,047, filed Nov. 4, 2016. Both of these patent applications are incorporated herein by reference.)

Figure 12A:
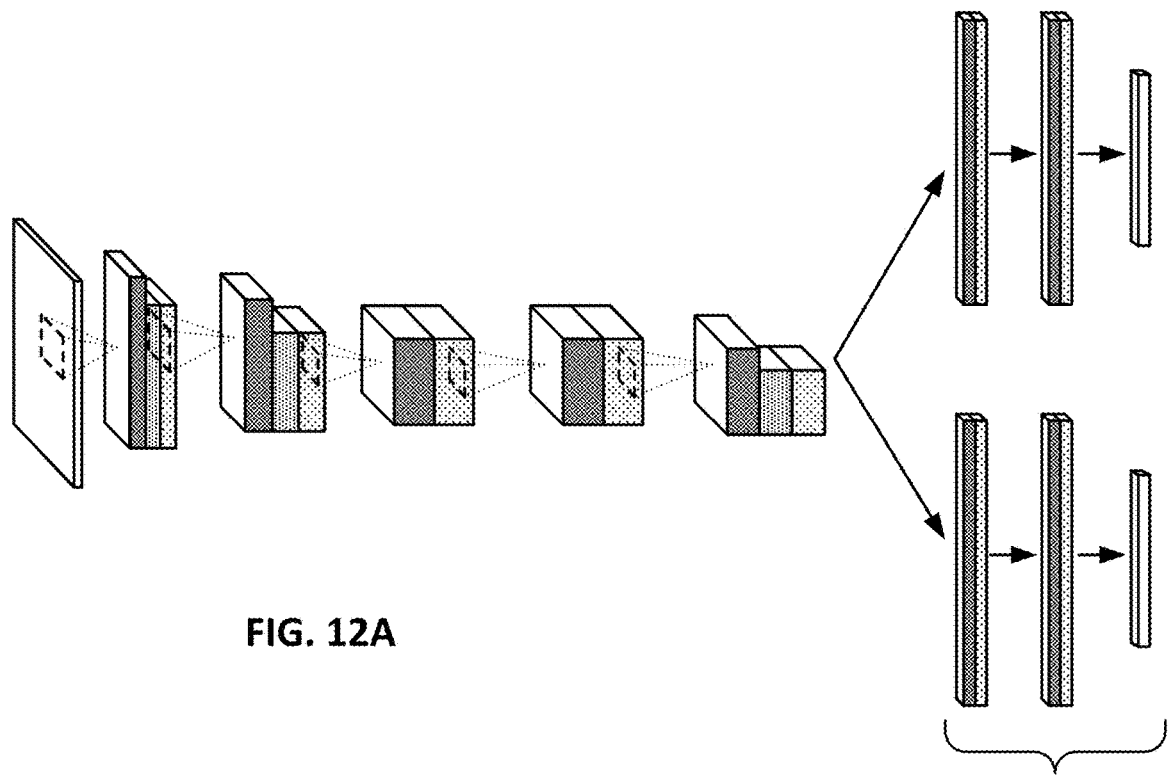
FIGS. 12A and 12B are block diagrams of variant convolution neural networks employing plural output layers.
Figure 12B:
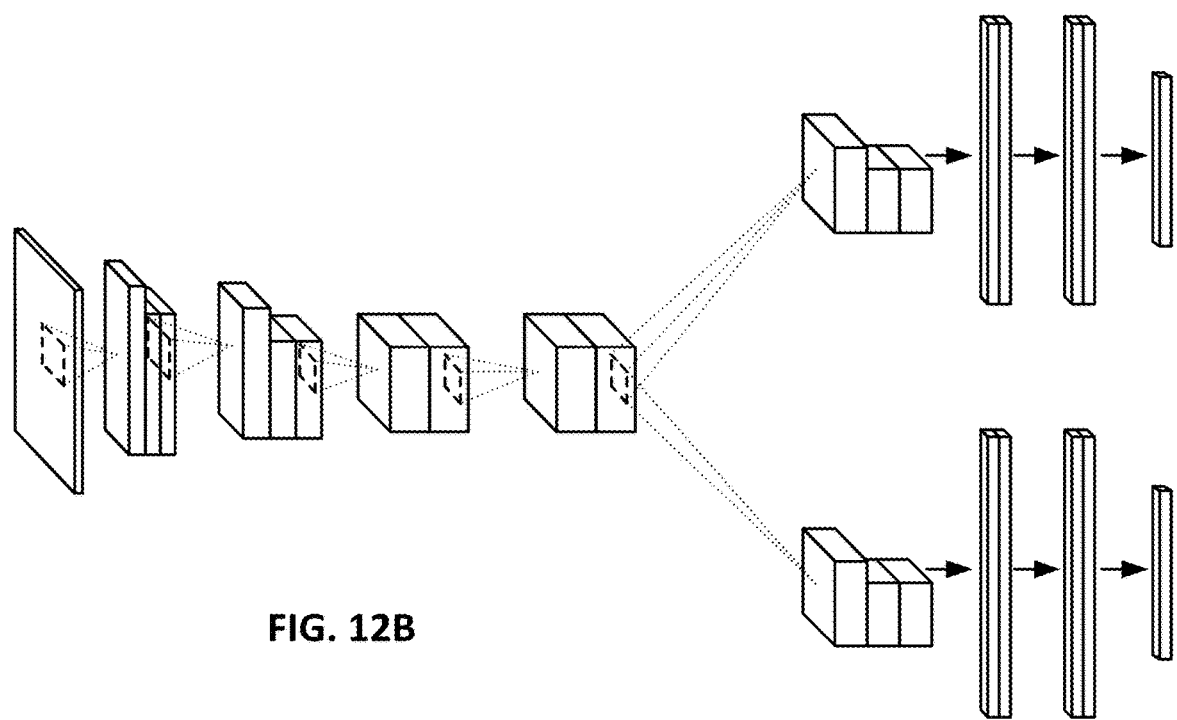

In a network that characterizes a watermark pattern by plural parameters, such as its scale range and its rotation range, etc., the network can employ plural sets of output layers—each trained to indicate a different one of the parameters. Such networks can take various forms, e.g., as depicted by FIGS. 12A and 12B. Other variant structures are shown in U.S. Pat. No. 10,664,722.

Alternatively, a network with a single output stage can be trained to activate two output neurons in response to certain input imagery. One neuron can indicate the scale range in which a watermark pattern sensed in the imagery falls, and the other can indicate the rotation range in which such watermark pattern falls. The training of a classifier to respond to certain stimulus by activating two (or more) of plural output neurons is known in the art, as detailed by writings such as Bishop, Pattern Recognition and Machine Learning, Springer, 2007 (ISBN 0387310738). A relevant excerpt, from section 4.3.4 of the Bishop book, entitled Multiclass Logistic Regression, is attached to patent application 62/426,148, filed Nov. 23, 2016, which is incorporated herein by reference. Further details are also disclosed in U.S. Pat. No. 10,664,722.

In some arrangements, a system may apply several different recognition operations to frames of captured imagery. Such systems are detailed in U.S. Pat. No. 10,488,912 (which is incorporated herein by reference), and in others of the patent documents referenced herein. For example, one frame may be analyzed for a barcode (or several barcodes, having different locations/parameters), a next frame may be analyzed for a digital watermark, and a following frame may be analyzed for item recognition. A single neural network may be used for each phase of operation (e.g., applying corresponding network coefficients for each phase). Or plural different recognition systems can be applied (e.g., as detailed in U.S. Pat. No. 10,664,722).

While the technology is illustrated in connection with analysis of 2D data, it should be understood that the same principles are likewise applicable to data of other dimensions.

Some researchers are urging more widespread use of deeper networks, such as the He paper cited above. With deeper networks, it can be cumbersome to manually select filter dimensions for each layer. Many researchers have thus proposed using higher level building blocks, such as "Inception modules" to simplify network design. Inception modules commonly include filters of several different dimensionalities (typically 1×1, 3×3, and sometimes 1×3, 3×1 and 5×5). Much work in the area has been done by Google, whose neural network patent publications teach these and many other features. See, e.g., U.S. Pat. Nos. 9,514,389, 9,911,069, 10,460,211, 10,467,493, and 10,521,718 the disclosures of which are incorporated herein by reference.

The large model sizes of some networks can be a challenge for implementation in certain environments, e.g., on mobile devices. Arrangements such as that taught by Iandola, SqueezeNet: AlexNet-level accuracy with 50× fewer parameters and <0.5 MB model size, arXiv preprint arXiv: 1602.07360, 2016 (attached to patent application 62/418, 047, which is incorporated herein by reference) can be employed to realize classifiers of lower complexity.

Another approach to reducing the network size is to employ a different type of classifier output structure. Most of the network size (required memory) is due to use of a fully-connected-layers (multi-layer perceptron) output arrangement. Different classification networks can be employed instead, such as an SVM or tree classifier, which may create decision boundaries otherwise—such as by a hyperplane. In one particular embodiment, the network is originally configured, and trained, using a multi-layer perceptron classifier. After training, this output structure is removed and a different classifier structure is employed in its stead. Further training of the network can proceed with the new output structure in place. If new object classes are introduced, the network—employing the new output classifier—can be retrained as necessary to recognize the new classes.

While most neural networks used for image recognition operate on down-sampled imagery (e.g., a camera may capture a 2000×1000 pixel image, and it is down-sized by interpolation or otherwise by a factor of four or more to yield a 256×256 image for processing by the network), applicant generally prefers to operate to full-resolution imagery, or imagery that has been down-sampled by a relatively small amount, e.g., by a factor of three or less.

While applicant's particular interests involve detecting, and sometimes characterizing, watermark patterns in imagery, the technologies detailed herein are not so limited. They can be used in any type of image recognition network. Examples include facial recognition, optical character recognition, vehicle navigation, medical diagnosis, analyzing video for offensive material, barcode reading, etc. Moreover, the same techniques are analogously applicable to recognition of audio and other so-called 1D data (whether the dimension is time or otherwise).

Although the depicted network operates on an input array of size 224×224, this is naturally only for purposes of illustration and is not limiting. The data arrays can be smaller or (much) larger.

To analyze a larger area of imagery, the data array size can be increased. Alternatively, multiple instances of the network can be applied to different patches of the imagery. Thus, to analyze a 512×512 area of pixels, a single network trained for processing such imagery can be used. Alternatively, the imagery may be regarded as four adjoining patches of 256×256 pixels, and can be analyzed on this basis. An advantage of the latter approach is a geometric reduction in the size of the network (e.g., in terms of its coefficient count and memory requirements); the four different patches of imagery can be processed by multiple use of a single, smaller set of coefficients. (In some such embodiments there can be an advantage to providing an overlap of multiple rows or columns of pixels between adjoining patches.)

In a particular embodiment, a network according to the present technology is employed as a first, screening stage in a watermark detection system—used simply to flag the likely presence of a watermark in imagery, and perhaps to discern some information about its likely pose (scale, rotation and/or translation). If the network indicates likely presence of a watermark, then subsequent processing of the imagery is triggered. If not, then no further time needs to be devoted to that imagery.

If information about the watermark's likely pose state is produced, then this information can be used to narrow the range of poses over which the subsequent processing searches to find the watermark. For example, if a direct least squares technique is subsequently employed, as detailed in the earlier-referenced U.S. Pat. Nos. 9,959,587 and 10,242, 434, then the "seeds" that define the pose search range can be chosen to focus on the general range(s) identified by the neural network.

Such first stage screening of imagery for watermarks can be used wherever watermark detection is utilized. Examples include processing imagery depicting retail items in supermarkets (e.g., for point of sale identification), and imagery depicting waste streams in materials recovery facilities (e.g. for sorting plastic containers for recycling). Since the network, once trained, is primarily implemented as a succession of simple adds and multiplies, the detection operation can be executed extremely quickly. A large image can be analyzed by decomposing it into, e.g., 256×256 pixel patches, and processing each patch to identify the location(s) within the image where a watermark seems present. Plural patches can be processed in parallel on a computer with one or more a multi-threaded processors.

This specification makes various references to watermark detection used in recycling. Applicant's patent publications 20190306385 and WO2020186234, and pending application Ser. No. 16/944,136, filed Jul. 30, 2020 and Ser. No. 17/214,455, filed Mar. 26, 2021, further detail recycling applications, as well as information on watermarking generally and other topics. Such documents are incorporated herein by reference.

Watermark signals are often small in magnitude, and compete with noise for detection. Detection enhancement can be achieved by characterizing sensor irregularities that contribute their own noise, e.g., by subtracting-out an estimate of such noise sources. On such technique is dark frame subtraction. Another is to discern which pixels are "hot" or "cold" relative to neighbors, and to take corrective action in response. Such techniques are detailed in applicant's U.S. Pat. No. 9,544,516, the disclosure of which is incorporated by reference.

The term "watermark" commonly denotes an indicia that escapes human attention, i.e., is steganographic. While steganographic watermarks can be advantageous, they are not essential. Watermarks forming overt, human-conspicuous patterns, can be employed in embodiments of the present technology.

For purposes of this patent application, a watermark is a 2D code produced through a process that represents a message of N symbols using K output symbols, where the ratio N/K is less than 0.2. (In convolutional coding terms, this is the base rate, where smaller rates indicate greater redundancy and thus greater robustness in conveying information through noisy "channels"). In preferred embodiments the ratio N/K is 0.1 or less. Due to the small base rate, a payload can be decoded from a watermark even if half of more (commonly three-quarters or more) or the code is missing.

In a particular embodiment, 47 payload bits are concatenated with 24 CRC bits, and these 71 bits ("N") are convolutionally encoded at a base rate of $\frac{1}{13}$ to yield 924 bits ("K"). A further 100 bits of version data are appended to indicate version information, yielding the 1024 bits referenced earlier (which are then scrambled and spread to yield the 16,384 values in a 128×128 continuous tone watermark).

Some other 2D codes make use of error correction, but not to such a degree. A QR code, for example, encoded with the highest possible error correction level, can recover from only 30% loss of the code.

Preferred watermark embodiments are also characterized by a synchronization (reference) signal component that is expressed where message data is also expressed. For example, every mark in a sparse watermark is typically a function of the synchronization signal. Again in contrast, synchronization in QR codes is achieved by alignment patterns placed at three corners and at certain intermediate cells. Message data is expressed at none of these locations.

While this specification started by emphasizing the present technology's status as an improvement to the techniques detailed in patent publications 10,664,722 and 20190266749, it bears repeating. The arrangements detailed herein are expressly taught as being implemented in conjunction with the arrangements detailed in those publications.

The present technology can be implemented using Caffe—an open source framework for deep learning algorithms, distributed by the Berkeley Vision and Learning Center and detailed, e.g., in the paper by Jia attached to incorporated-by-reference application 62/404,721. (Caffe provides a version of the "AlexNet" architecture that is pre-trained to distinguish 1000 "ImageNet" object classes.) Other suitable platforms to realize the arrangements detailed above include TensorFlow from Google, Theano from the Montreal Institute for Learning Algorithms, the Microsoft Cognitive Toolkit, Torch from the Dalle Molle Institute for Perpetual AI, MX-Net from a consortium including Amazon, Baidu and Carnegie Mellon University, and Tiny-DNN on Github.

For training, the Caffe toolset can be used in conjunction with a computer equipped with multiple Nvidia TitanX GPU cards. Each card includes 3,584 CUDA cores, and 12 GB of fast GDDR5X memory.

Once trained, the processing performed by the detailed neural networks is relatively modest. Some hardware has been developed especially for this purpose, e.g., to permit neural networks to be realized within the low power constraints of mobile devices. Examples include the Snapdragon 820 system-on-a-chip from Qualcomm, and the Tensilica T5 and T6 digital signal processors from Cadence. (Qualcomm provides an SDK designed to facilitate implementation of neural networks with its 820 chip: the Qualcomm Neural Processing Engine SDK.)

Alternatively, the trained neural networks can be implemented in a variety of other hardware structures, such as a microprocessor, an ASIC (Application Specific Integrated Circuit) and an FPGA (Field Programmable Gate Array). Hybrids of such arrangements can also be employed, such as reconfigurable hardware, and ASIPs.

By microprocessor, Applicant means a particular structure, namely a multipurpose, clock-driven, integrated circuit that includes both integer and floating point arithmetic logic units (ALUs), control logic, a collection of registers, and scratchpad memory (aka cache memory), linked by fixed bus interconnects. The control logic fetches instruction codes from a memory (often external), and initiates a sequence of operations required for the ALUs to carry out the instruction code. The instruction codes are drawn from a limited vocabulary of instructions, which may be regarded as the microprocessor's native instruction set.

A particular implementation of one of the above-detailed arrangements on a microprocessor can begin by first defining the sequence of operations in a high level computer language, such as MatLab or C++ (sometimes termed source code), and then using a commercially available compiler (such as the Intel C++ compiler) to generate machine code (i.e., instructions in the native instruction set, sometimes termed object code) from the source code. (Both the source code and the machine code are regarded as software instructions herein.) The process is then executed by instructing the microprocessor to execute the compiled code.

Many microprocessors are now amalgamations of several simpler microprocessors (termed "cores"). Such arrangements allow multiple operations to be executed in parallel. (Some elements—such as the bus structure and cache memory may be shared between the cores.)

Examples of microprocessor structures include the Intel Xeon, Atom and Core-I series of devices. They are attractive choices in many applications because they are off-the-shelf components. Implementation need not wait for custom design/fabrication.

Closely related to microprocessors are GPUs (Graphics Processing Units). GPUs are similar to microprocessors in that they include ALUs, control logic, registers, cache, and fixed bus interconnects. However, the native instruction sets of GPUs are commonly optimized for image/video processing tasks, such as moving large blocks of data to and from memory, and performing identical operations simultaneously on multiple sets of data (e.g., pixels or pixel blocks). Other specialized tasks, such as rotating and translating arrays of vertex data into different coordinate systems, and interpolation, are also generally supported. The leading vendors of GPU hardware include Nvidia, ATI/AMD, and Intel. As used herein, Applicant intends references to microprocessors to also encompass GPUs.

GPUs are attractive structural choices for execution of the detailed arrangements, due to the nature of the data being processed, and the opportunities for parallelism.

While microprocessors can be reprogrammed, by suitable software, to perform a variety of different algorithms, ASICs cannot. While a particular Intel microprocessor might be programmed today to perform neural network item identification, and programmed tomorrow to prepare a user's tax return, an ASIC structure does not have this flexibility. Rather, an ASIC is designed and fabricated to serve a dedicated task, or limited set of tasks. It is purpose-built.

An ASIC structure comprises an array of circuitry that is custom-designed to perform a particular function. There are two general classes: gate array (sometimes termed semi-custom), and full-custom. In the former, the hardware comprises a regular array of (typically) millions of digital logic gates (e.g., XOR and/or AND gates), fabricated in diffusion layers and spread across a silicon substrate. Metallization layers, defining a custom interconnect, are then applied—permanently linking certain of the gates in a fixed topology. (A consequence of this hardware structure is that many of the fabricated gates—commonly a majority—are typically left unused.)

In full-custom ASICs, however, the arrangement of gates is custom-designed to serve the intended purpose (e.g., to perform a specified function). The custom design makes more efficient use of the available substrate space—allowing shorter signal paths and higher speed performance. Full-custom ASICs can also be fabricated to include analog components, and other circuits.

Generally speaking, ASIC-based implementations of the detailed arrangements offer higher performance, and consume less power, than implementations employing microprocessors. A drawback, however, is the significant time and expense required to design and fabricate circuitry that is tailor-made for one particular application.

An ASIC-based implementation of one of the above arrangements again can begin by defining the sequence of algorithm operations in a source code, such as MatLab or C++. However, instead of compiling to the native instruction set of a multipurpose microprocessor, the source code is compiled to a "hardware description language," such as VHDL (an IEEE standard), using a compiler such as HDL-Coder (available from MathWorks). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

A third hardware structure that can be used to implement the above-detailed arrangements is an FPGA. An FPGA is a cousin to the semi-custom gate array discussed above. However, instead of using metallization layers to define a fixed interconnect between a generic array of gates, the interconnect is defined by a network of switches that can be electrically configured (and reconfigured) to be either on or off. The configuration data is stored in, and read from, a memory (which may be external). By such arrangement, the linking of the logic gates—and thus the functionality of the circuit—can be changed at will, by loading different configuration instructions from the memory, which reconfigure how these interconnect switches are set.

FPGAs also differ from semi-custom gate arrays in that they commonly do not consist wholly of simple gates. Instead, FPGAs can include some logic elements configured to perform complex combinational functions. Also, memory elements (e.g., flip-flops, but more typically complete blocks of RAM memory) can be included. Again, the reconfigurable interconnect that characterizes FPGAs enables such additional elements to be incorporated at desired locations within a larger circuit.

Examples of FPGA structures include the Stratix FPGA from Altera (now Intel), and the Spartan FPGA from Xilinx.

As with the other hardware structures, implementation of the above-detailed arrangements begins by specifying the operations in a high level language. And, as with the ASIC implementation, the high level language is next compiled into VHDL. But then the interconnect configuration instructions are generated from the VHDL by a software tool specific to the family of FPGA being used (e.g., Stratix/Spartan).

Hybrids of the foregoing structures can also be used to implement the detailed arrangements. One structure employs a microprocessor that is integrated on a substrate as a component of an ASIC. Such arrangement is termed a System on a Chip (SOC). Similarly, a microprocessor can be among the elements available for reconfigurable-interconnection with other elements in an FPGA. Such arrangement may be termed a System on a Programmable Chip (SORC).

Another hybrid approach, termed reconfigurable hardware by the Applicant, employs one or more ASIC elements. However, certain aspects of the ASIC operation can be reconfigured by parameters stored in one or more memories. For example, the weights of convolution kernels can be defined by parameters stored in a re-writable memory. By such arrangement, the same ASIC may be incorporated into two disparate devices, which employ different convolution kernels. One may be a device that employs a neural network to recognize grocery items. Another may be a device that employs a neural network to read license plates. The chips are all identically produced in a single semiconductor fab, but are differentiated in their end-use by different kernel data stored in memory (which may be on-chip or off).

Yet another hybrid approach employs application-specific instruction set processors (ASIPS). ASIPS can be thought of as microprocessors. However, instead of having multipurpose native instruction sets, the instruction set is tailored—in the design stage, prior to fabrication—to a particular intended use. Thus, an ASIP may be designed to include native instructions that serve operations associated with some or all of: convolution, max-pooling, ReLU, etc., etc. However, such native instruction set would lack certain of the instructions available in more general purpose microprocessors.

Reconfigurable hardware and ASIP arrangements are further detailed in U.S. Pat. No. 9,819,950, the disclosure of which is incorporated herein by reference.

In addition to the toolsets developed especially for neural networks, familiar image processing libraries such as OpenCV can be employed to perform many of the methods detailed in this specification. Software instructions for implementing the detailed functionality can also be authored by the artisan in C, C++, MatLab, Visual Basic, Java, Python, Tcl, Perl, Scheme, Ruby, etc., based on the descriptions provided herein.

Software and hardware configuration data/instructions are commonly stored as instructions in one or more data structures conveyed by tangible media, such as magnetic or optical discs, memory cards, ROM, etc., which may be accessed across a network.

This specification has discussed several different arrangements. It should be understood that the methods, elements and features detailed in connection with one arrangement can be combined with the methods, elements and features detailed in connection with other arrangements. While some such arrangements have been particularly described, many have not—due to the large number of permutations and combinations.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of Applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

To provide a comprehensive disclosure, while complying with the Patent Act's requirement of conciseness, Applicant incorporates-by-reference each of the documents referenced herein. (Such materials are incorporated in their entireties, even if cited above in connection with specific of their teachings.) These references disclose technologies and teachings that Applicant intends be incorporated into the arrangements detailed herein, and into which the technologies and teachings presently-detailed be incorporated.

The invention claimed is:

1. In a neural network comprising first and second stages configured for image recognition, at least one of said stages including a convolutional layer, and a method comprising the acts:
    receiving an array of output data from the first stage, said array of output data having dimensions of at least 11×11 elements; and
    spatially-transposing said array of output data, and employing a resulting array of spatially-transposed data as input data in the second stage;
    wherein spatially-transposing the array of output data prior to provision to the second stage, and
    wherein the output of the first stage is coupled to the input of the second stage by a twisted coupling interconnect to increase the reliability of image recognition at different orientations.

2. The method of claim 1 in which said spatially-transposing comprises rotating.

3. The method of claim 1 in which said spatially-transposing comprises scaling.

4. The method of claim 1 in which said spatially-transposing comprises spatial translating.

5. The method of claim 1 in which said spatially-transposing comprises rotating, scaling, and spatially-translating.

6. The method of claim 1 that includes learning a parameter that characterizes said operation through a training process.

7. The method of claim 6 in which said training process is a gradient descent training process.

8. The method of claim 6 that further includes learning coefficients for one or more of said stages by said training process.

9. The method of claim 1 in which said spatially-transposing includes computing one value in said array of spatially-transposed data as a weighted sum of plural values in said array of output data.

10. The method of claim 9 in which said array of output data includes plural rows of data including a top row, a bottom row, and plural intermediate rows, wherein said weighted sum of plural values is computed in toroidal fashion, as a sum that includes one or more values from said top row, and one or more values from said bottom row, but no value from one of said intermediate rows.

11. The method of claim 1 in which spatially-transposing the array of output data comprises one or more operations from the list: rotating, scaling and spatially-translating.

12. The method of claim 11 in which spatially-transposing the array of output data comprises two of: rotating, scaling, and spatially-translating.

13. A neural network system for image recognition, comprising:
    a first stage and a second stage, at least one of said stages including a convolutional layer; and
    a multi-core processor configured to:
    receive an array of output data from the first stage, said array of output data having dimensions of at least 11×11 elements;
    spatially-transpose said array of output data; and
    employ a resulting array of spatially-transposed data as input data in the second stage,
    wherein the output of the first stage is coupled to the input of the second stage by a twisted coupling interconnect to increase the reliability of image recognition at different orientations.

14. The system of claim 13, wherein said multi-core processor is further configured to learn a parameter that characterizes said operation through a training process.

15. The system of claim 14, wherein said training process is a gradient descent training process.

16. The system of claim 14, wherein said multi-core processor is further configured to learn coefficients for one or more of said stages by said training process.

17. The system of claim 13, wherein said spatially-transposing includes computing one value in said array of spatially-transposed data as a weighted sum of plural values in said array of output data.

18. The system of claim 17, wherein said array of output data includes plural rows of data including a top row, a bottom row, and plural intermediate rows, wherein said weighted sum of plural values is computed in toroidal fashion, as a sum that includes one or more values from said top row, and one or more values from said bottom row, but no value from one of said intermediate rows.

19. The system of claim 13, wherein the second stage comprises a digital watermarking stage, and said spatially-transposed data is utilized in the digital watermark stage to resolve image distortion.

20. A neural network system for image recognition, comprising:
    a first stage, having an input and an output, for processing first input data applied to the input to produce first output data at the output, said first output data comprising array data having dimensions of at least 11×11 elements; and
    a second stage having an input and an output, for processing second input data applied to the second stage input to produce second output data at the second stage output, at least one of said first stage and said second stage including a convolutional layer;
    wherein the output of the first stage is coupled to the input of the second stage by a twisted coupling interconnect;
    wherein said array data produced at the output of the first stage is spatially-transposed prior to being applied to the input of the second stage as the second input data to increase the reliability of image recognition at different orientations.

21. The system of claim 20, further comprising a processor configured to learn a parameter that characterizes said operation through a training process.

22. The system of claim 21, wherein said training process is a gradient descent training process.

23. The system of claim 21, further comprising a processor configured to learn coefficients for one or more of said stage means by said training process.

24. The system of claim 20, wherein said spatially transposed data is produced by computing one value as a weighted sum of plural values in said array of output data.

25. The system of claim 24, wherein said array of output data includes plural rows of data including a top row, a bottom row, and plural intermediate rows, further comprising a processor that computes said weighted sum of plural values in toroidal fashion, as a sum that includes one or more values from said top row, and one or more values from said bottom row, but no value from one of said intermediate rows.

26. The system of claim 20, wherein the second stage comprises digital watermarking, and said spatially-transposed data is utilized by said digital watermarking to resolve image distortion.

* * * * *